United States Patent [19]

Sato

[11] Patent Number: 5,761,003
[45] Date of Patent: Jun. 2, 1998

[54] MAGNETIC HEAD SLIDER WITH CROWN ABS

[75] Inventor: Toshiharu Sato, Kawagoe, Japan

[73] Assignee: Citizen Watch Co., Ltd., Tokyo, Japan

[21] Appl. No.: 603,126

[22] Filed: Feb. 20, 1996

[30] Foreign Application Priority Data

Feb. 21, 1995 [JP] Japan .................................. 7-032069
Sep. 20, 1995 [JP] Japan .................................. 7-241363

[51] Int. Cl.$^6$ ...................................................... G11B 5/60
[52] U.S. Cl. ............................................................ 360/103
[58] Field of Search ........................................ 360/103, 102

[56] References Cited

U.S. PATENT DOCUMENTS

| | | | |
|---|---|---|---|
| 4,420,780 | 12/1983 | Deckert | 360/103 |
| 5,396,387 | 3/1995 | Murray | 360/103 |
| 5,406,432 | 4/1995 | Murray | 360/103 |
| 5,490,026 | 2/1996 | Dorius et al. | 360/103 |

OTHER PUBLICATIONS

C.E. Yeack-Scranton et al., "An Active Slider for Practical Contact Recording, "IEEE Transactions on Magnetics, vol. 26, No. 5, pp. 2478–2483, Sep. 1990.

Vijay D. Khanna et al., "Programmable Air Bearing Sliders for Magnetic Storage," Tribology Transactions, vol. 34, No. 4, pp. 559–564, 1991.

K. Fukuda et al., "Thin Film Head for Quasi–contact Head/ Disk Interface," IEEE Transactions on Magnetics, vol. 27, No. 6, pp. 5082–5084, Nov. 1991.

D.S. Chhabra et al., "Air Bearing Design Considerations for Constant Fly Height Applications," IEEE Transactions on Magnetics, vol. 30, No. 2, pp. 417–423, Mar. 1994.

Cal Hardie et al., "Analysis and Performance Characteristics of the Seagate Advanced Air Bearing Slider," IEEE Transactions on Magnetics, vol. 30, No. 2, pp. 424–432, Mar. 1994.

Makoto Watanabe et al., "An Air Bearing Slider for Small Diameter Disk Storage Devices," Tribology Transactions, vol. 35, No. 3, pp. 544–550, 1992.

*Primary Examiner*—Stuart S. Levy
*Assistant Examiner*—William R. Korzuch
*Attorney, Agent, or Firm*—Finnegan, Henderson, Farabow, Garrett & Dunner

[57] ABSTRACT

A magnetic head slider including a crown air-bearing surface (ABS) adapted to be located opposite to a magnetic disk. The ABS includes a front air-introducing end and a rear air-discharging end formed respectively along opposed two edges of the ABS. The ABS also includes a pressure generating section for generating both positive and negative pressure due to air introduced from the air-introducing end onto the ABS when the magnetic disk rotates. The pressure generating section extends from the air-introducing end to a boundary positioned between a laterally extending center line of the ABS and the air-discharging end, and includes at least one rail with a convexly curved upper surface. The ABS further includes a bump with a convexly curved upper surface, arranged at a center of the air-discharging end and longitudinally spaced from the boundary. The bump has such a small dimension that a dynamic pressure due to the air introduced onto the ABS is hardly applied to the bump. The slider further includes a magnetic head element formed adjacent to the bump.

4 Claims, 10 Drawing Sheets

MAGNETIC HEAD SLIDER WITH CROWN ABS

BACKGROUND OF THE INVENTION

1. Field of the Invention

The present invention relates generally to a magnetic recording technique and, particularly, to a magnetic head slider used for a magnetic disk unit.

2. Description of the Related Art

In a conventional magnetic disk unit, a magnetic head slider carrying a magnetic head element thereon is moved over the surface of a rotating magnetic disk to place the head element at a desired position over the magnetic disk and to enable the head element to read or write information on the disk. The magnetic head slider is generally mounted on the distal end of a loading beam and is adapted to be biased toward the rotating magnetic disk under a predetermined force caused due to the loading beam. The proximal end of the loading beam is connected to a rotary or linear actuator, and the magnetic head slider is moved, together with the loading beam, by the operation of the actuator.

When the magnetic head slider is moved over the rotating magnetic disk and the magnetic head element reads or writes information on the disk, the slider normally maintains a predetermined small gap between the head element and the rotating disk in a following manner. When the magnetic disk rotates, air enters between the disk and the slider to cause dynamic pressure to be applied to the slider. The dynamic pressure acts as lifting force to lift the slider away from the rotating disk. This lifting force may be varied due to a gap shape, disk rotation speed, air viscosity, atmospheric pressure, and so forth. On the other hand, the slider is biased toward the rotating disk by a predetermined force due to the loading beam. Consequently, the magnetic head slider "flies" in a position where the lifting force and the biasing force balance.

The amount of the gap between the magnetic head element of "flying" slider and the rotating magnetic disk, the amount being referred to as a "flying height", has a significant influence on the electro-magnetic conversion efficiency of the head element. To obtain high capacity and high density of the read/write performance of the head element, it has been desired to minimize the gap or flying height as much as possible. The flying height is now (in 1995) required to be in a range between 50 nm and 100 nm, and will (in 1997) be required to be in a range between 30 nm and 50 nm. Further, the flying height will (in 2000) be required to be not exceeding 10 nm, which is recognized as substantially contact recording. When the flying height is reduced, the magnetic head slider will frequently collide with the rotating magnetic disk, which deteriorates the operational reliability of a magnetic disk unit due to wear or fracture of the slider. Of course, a contact recording technique requires reducing the risk of wearing of the slider, particularly of the slider part carrying the magnetic head element.

The shape of the gap between the "flying" magnetic head slider and the rotating magnetic disk, i.e., the shape of the working surface of the slider to which the dynamic pressure is applied, has a significant influence on the magnitude of the dynamic pressure and on a pressure distribution. Generally, the working surface of the slider, adapted to be opposed to the magnetic disk, is formed unevenly so as to obtain a desired lifting force or a desired pressure distribution. Such a working surface is referred to as an "air-bearing surface" or "ABS". When the magnetic head slider is designed, the shape of the ABS and the biasing force of the loading beam are selected so as to obtain a desired flying performance of the slider under the certain working conditions in a magnetic disk unit for which the slider is used, the working conditions being such as the rotation speed of the disk, the radial position of the slider over the disk, and so forth.

In conventional magnetic head sliders, a higher rotation speed of the magnetic disk normally results in a larger gap between the slider and the disk, and in a larger flying height of a magnetic head element. In this respect, the conventional slider is generally designed in such a manner that a front end of the slider, along which air enters between the slider and the rotating disk, is lifted higher than a rear end of the slider, along which air exits from a resultant gap between the slider and the rotating disk, and adjacent which a magnetic head element is arranged. Therefore, the rear end of the slider, being provided with the head element, is located nearest to the rotating disk when the slider flies over the disk. The angle defined between a longitudinal axis of the slider, extending from the front end to the rear end, and the surface of the rotating disk is referred to as a "pitch angle", which depends on the pressure distribution applied on the ABS.

If the magnetic disk rotates in a constant speed, the tangential velocity of the disk is increased as the velocity measuring point is shifted from a radially inner position to a radially outer position on the disk. Therefore, the dynamic pressure applied to the slider is generally increased as the slider is shifted radially from inside to outside over the disk rotating at a constant speed, and thereby both the pitch angle and the flying height are generally increased.

The several solutions to ensure a constant, lower flying height are known. U.S. Pat. No. 4,420,780 discloses a magnetic head slider of a crown type, which includes a crown or convexly curved rectangular ABS which is provided with a front air-introducing end and a rear air-discharging end formed respectively along opposed two edges of the ABS. The crown ABS includes two convexly curved rails elongated from the air-introducing end to the air-discharging end respectively along another opposed two edges of the ABS, and one flat rail elongated along the air-introducing end and transversely connecting the convexly curved rails with each other. These three rails define a recess therebetween, which is opened at the air-discharging end, and thus which generates negative pressure on the ABS when a magnetic disk rotates. The slider further includes a thin-film magnetic head element arranged at the air-discharging end adjacent to the convexly curved rails.

In this magnetic head slider, when the rotation speed of the magnetic disk is increased, positive pressure generated on the convexly curved upper surfaces of the rails as well as negative pressure generated in the recess rise. Consequently, even if the rotating speed of the disk is changed, the total lifting force applied to the slider, and thus the flying height, hardly vary.

As mentioned above, the magnetic head slider adapted to utilize negative pressure generated on the ABS can effectively establish a generally constant flying height. Also, such a negative pressure type slider has an advantage that positive pressure generated on the rails can be increased without varying the flying height and thus the dimension of the rails can be increased to improve the mechanical strength of the rails.

Further, in the case that the magnetic head slider of a crown type is used in a contact-start-stop (so called "CSS") type magnetic disk unit, wherein the slider lands on the magnetic disk when the disk does not rotate, the crown type slider comes into contact with the disk at the top area of the convexly curved upper surface of the rail, while the remaining upper surface area of the rail, including the rear end thereof adjacent to a magnetic head element, is away from the disk when the disk does not rotate. Therefore, the crown type slider can minimize the risk that the head element sticks on the magnetic disk when the slider is ready to start the CSS. Also, the crown type slider can begin to fly at a lower disk speed, because the front air-introducing end of the ABS is distant from the disk when the slider is ready to start the CSS and thus air can readily act on the upper surface of the rail. As a result, the slider can quickly leave the disk which starts to rotate, whereby the risk of wear or fracture of the slider can be reduced.

However, the problems of the instability of flying height arise in the conventional crown, negative pressure type, slider when the gap between the slider and the rotating disk becomes very small. When the amount of the gap is reduced to the same degree or less than the mean free path of air molecules, i.e., 65 nm at 1.013 hPa, the air passing through the gap is rarefied and thus pressure in the gap becomes unstable and small. Therefore, when the flying height is reduced to, e.g., 20 nm, the positive pressure generated on the rail near the head element becomes unstable so that it is difficult to maintain the lower, stable flying height, whereby the risk of damage to the head element increases.

EP 0558983 A1 discloses a magnetic head slider, of a flat plate type, which includes a flat rectangular ABS which is provided with a front air-introducing end and a rear air-discharging end formed respectively along opposed two edges of the ABS. The flat ABS includes two flat rails or ridges elongated from the air-introducing end respectively along the other opposed two edges of the ABS to longitudinal midway points of these edges, and one flat bump arranged at the center of the air-discharging end. The rails are provided respectively at regions adjacent the air-introducing end with tapered- or stepped-down portions for introducing the air onto the upper surfaces of the rails. The bump has such a small dimension that a dynamic pressure due to the air introduced onto the ABS is hardly applied to the bump. The rails and the bump are spaced in both the lateral and the longitudinal directions. The slider further includes a thin-film magnetic head element arranged at the air-discharging end adjacent to the bump.

In this magnetic head slider, the dynamic pressure is applied mainly on the two rails when the magnetic disk rotates, to lift the slider away from the disk. The higher rotation speed of the disk results in the larger gap between the slider and the disk, and in the larger pitch angle. The bump causes little dynamic pressure in comparison with the rails, whereby this slider enables the bump of the head element to be maintained at a lower flying height or near the rotating disk, even when the rotation speed of the disk is increased. That is, the amount of the gap between the magnetic head element and the rotating magnetic disk, i.e., the flying height, will not change much even when the disk rotation speed varies.

However, it is necessary for establishing such a constant, low flying height that the rails and the bump are precisely dimensioned and positioned on the ABS, and that a pivot, at which a loading beam pivotably carries the slider in a pitching direction, is precisely located. Further, the bump having a small dimension for little dynamic pressure causes some defects, such as wear or fracture of the bump, or damage to a rotating magnetic disk, when the CSS method is adopted.

One example of a conventional magnetic head slider adapted to utilize a contact recording technique is commercially available as a "Micro Flex Head" manufactured by Censtor Co., U.S.A. This contact recording slider is made of an elastic material, and thus is not carried by a loading beam. A magnetic head element is mounted adjacent a bump arranged at a distal end of the slider. When the head element reads or writes an information on a magnetic disk, the bump is abutted onto the surface of the disk rotating, under a desired pressing force due to the elastic deformation of the slider. This contact recording slider has no ABS, and the bump is dimensioned so as to be applied with no dynamic pressure. The magnetic disk is provided on the main surface thereof with micro-protrusions for preventing the bump from being stuck onto the main surface. Accordingly, there is a micro-gap between the mutually contacted bump and disk, the gap being referred to as a "glide height".

The conventional contact recording slider generally has a problem of wear of the slider, which results in a deterioration of the recording efficiency. The "Micro Flex Head" can eliminate this problem by lowering a pressing force generated by the elastic deformation of the slider material and by reducing the mass of the slider. However, it is difficult to manufacture such a contact recording slider having low-elasticity and small weight, and thus the "Micro Flex Head" has a problem of the limitations for reducing a load or abutting force applied to the bump of the head element.

SUMMARY OF THE INVENTION

It is therefore an object of the present invention to provide a magnetic head slider which can establish a constant, low flying height even when the rotation speed of a magnetic disk is varied, and which can reduce a load applied to a head section of the slider, which carries a magnetic head element, when the head section is brought into contact with a magnetic disk being rotating.

It is another object of the present invention to provide a magnetic head slider which can be easily manufactured by using a conventional loading beam for biasing the slider.

In accordance with the present invention, there is provided a magnetic head slider carrying a magnetic head thereon and moved along a surface of a magnetic disk, comprising:

(a) a crown ABS adapted to be located opposite to the magnetic disk, the ABS including (1) a longitudinally front air-introducing end and a longitudinally rear air-discharging end formed respectively along two opposed edges of the ABS, (2) a pressure generating section for generating both positive and negative pressure to apply lifting force to the slider due to air introduced from the air-introducing end onto the ABS when the magnetic disk rotates, the pressure generating section being defined in a region extending from the air-introducing end to a boundary positioned between a laterally extending center line of the ABS and the air-discharging end, and (3) a head section arranged generally at a center of the air-discharging end and longitudinally spaced from the boundary of the pressure generating section, the head section being applied with substantially no dynamic pressure due to the air introduced onto the ABS; and (b) a magnetic head element formed associated with the head section of the ABS.

In the magnetic head slider with the above-mentioned structure, when the magnetic disk rotates, the slider flies over the disk due to the dynamic pressure applied to the ABS, and pitches to lift the air-introducing end. In this respect, the pressure generating section can generate both positive and negative pressure due to air introduced onto the ABS, so that, even if the disk rotation speed is changed, lifting force for lifting the slider, caused due to the dynamic pressure applied to the ABS, is hardly varied. Also, the dynamic pressure applied to the ABS can be prevented from being affected by rarefied air because the head section is spaced from the boundary of the pressure generating section, and thus the slider can provide a stable lifting force.

The crown ABS enables the slider to be brought into contact with the disk at the highest portion of the pressure generating section, when the slider is used in a CSS type magnetic disk unit and the disk does not rotate. In this state, the head section is distant from the disk. Therefore, the slider can eliminate a risk that the head section comes into contact with the disk, when the slider is ready to start CSS, or when the disk rotates at a lower speed. Consequently, the risk of wear or fracture of the slider, particularly of the head section, can be reduced.

Further, the head section is applied with substantially no dynamic pressure, so that the slider enables the head section to be maintained at a lower flying height, even when the disk rotation speed is increased. That is, a flying height does not change much even when the disk rotation speed varies. Consequently, the slider can effectively establish a generally constant, lower flying height. Further, in a contact recording condition, the slider can obtain a stable lifting force, and thus the load or abutting force applied to the head section can be stably reduced. Therefore, a conventional slider carrier can be used, which facilitate the easy manufacture of the slider.

It is preferred that the pressure generating section includes at least one rail with a convexly curved upper surface for generating positive pressure on the upper surface. In this case, at least one rail is elongated to cross the laterally extending center line of the air-bearing surface, and also defines a recess for generating negative pressure.

BRIEF DESCRIPTION OF THE DRAWINGS

The above and other objects, features, and advantages of the present invention will become more apparent from the following description of preferred embodiments in connection with the accompanying drawings, in which.

DESCRIPTION OF THE PREFERRED EMBODIMENT

Figure 1:
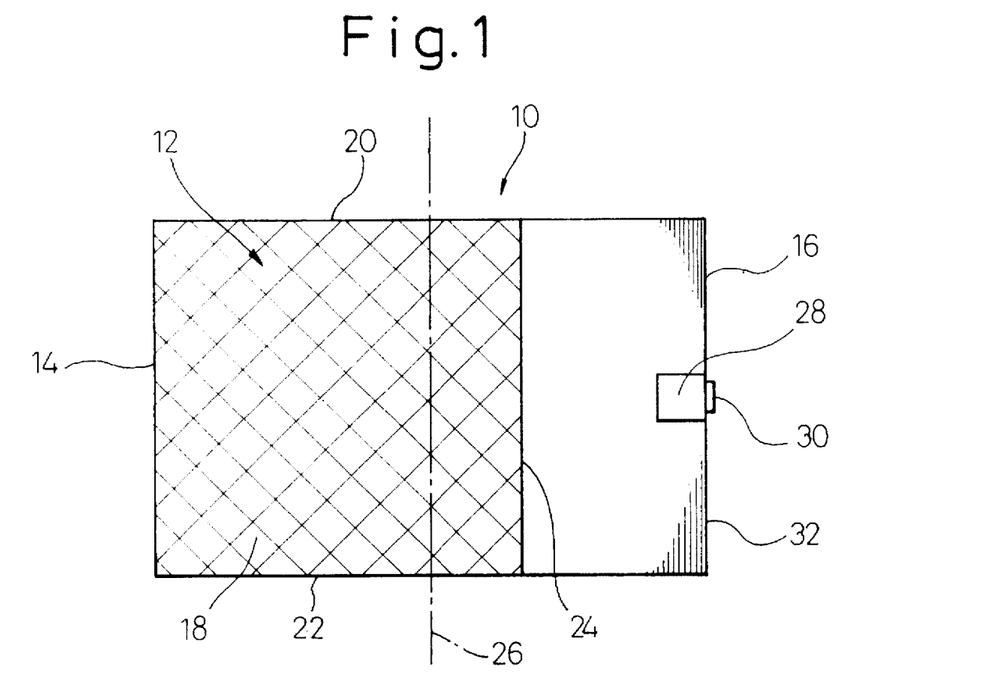
FIG. 1 is a plan view of a magnetic head slider, according to an embodiment of the present invention.
Figure 2:
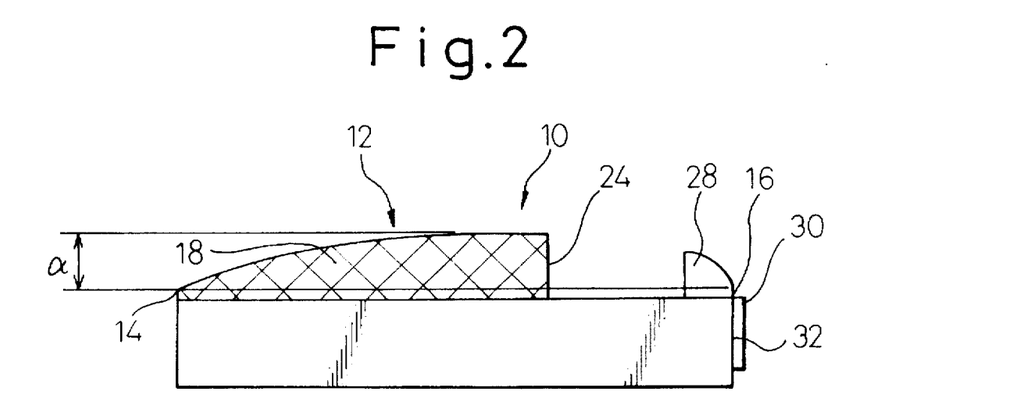
FIG. 2 is a side view of the magnetic head slider of FIG. 1.

Referring now to the drawings, wherein like reference numerals designate like or corresponding parts throughout the several views, FIGS. 1 and 2 diagrammatically show a magnetic head slider 10 according to the preferred embodiment of the present invention. The magnetic head slider 10 includes a crown or convexly curved, generally rectangular ABS 12 which is provided with a front air-introducing end 14 and a rear air-discharging end 16 formed respectively along opposed two edges of the ABS 12. Hereinafter, a "front" on the ABS 12 is defined at the air-introducing end 14, and a "rear" is at the air-discharging end 16, as well as a "longitudinal" direction on the ABS 12 is defined as a direction generally orthogonal to the front and rear ends 14, 16, and a "lateral" direction is as parallel to these ends 14, 16. The ABS 12 extends in a convexly curved manner along a longitudinal direction. The crown ABS 12 also includes a pressure generating section 18 for generating both positive and negative pressure due to air passing through a gap formed between the slider 10 and a magnetic disk 200 (see FIG. 3) being rotated.

The pressure generating section 18 extends between the other opposed two edges, i.e., side edges 20, 22, of the ABS 12, and from the air-introducing end 14 to a boundary 24 located between a laterally extending center line 26 of the ABS 12 and the air-discharging end 16. Preferably, the pressure generating section 18 has a surface area of from 50% to 85% of the ABS 12. The pressure generating section 18 is provided with at least one rail or ridge with a convexly curved upper surface (described in the examples mentioned below), which may have various shapes and dimensions for generating positive pressure on the upper surface thereof. At least one rail is arranged so as to cross the center line 26 of the ABS 12.

The crown ABS 12 further includes one bump 28 with a convexly curved upper surface, which is arranged generally at the center of the air-discharging end 16 and is spaced in a longitudinal direction from the boundary 24 of the pressure generating section 18. The bump 28 has such a small dimension that a dynamic pressure due to the air introduced onto the ABS 12 is hardly applied to the bump 28. The slider 10 further includes a thin-film magnetic head element 30 formed adjacent to the bump 28 and on an end surface 32 of the slider 10 arranged along the air-discharging end 16.

The crown height a of the ABS 12 is defined as a distance between the lowest portion, normally disposed on the air-introducing end 14, and the highest portion, normally disposed on the center line 26, of the convexly curved upper surface(s) of the rail(s) in the pressure generating section 18. In FIG. 2, the crown height α is shown in an enlarged scale in comparison with the entire dimension of the slider 10. The crown height α of the slider 10 can be made as large as the crown height of the conventional crown ABS, such as the ABS of the slider disclosed in U.S. Pat. No. 4,420,780, because the pressure generating section 18 extends from the air-introducing end 14 to a boundary 24 located between the center line 26 and the air-discharging end 16. The crown shape of the ABS 12 may be preferably formed along a circular arc or a parabolic path.

Figure 3:
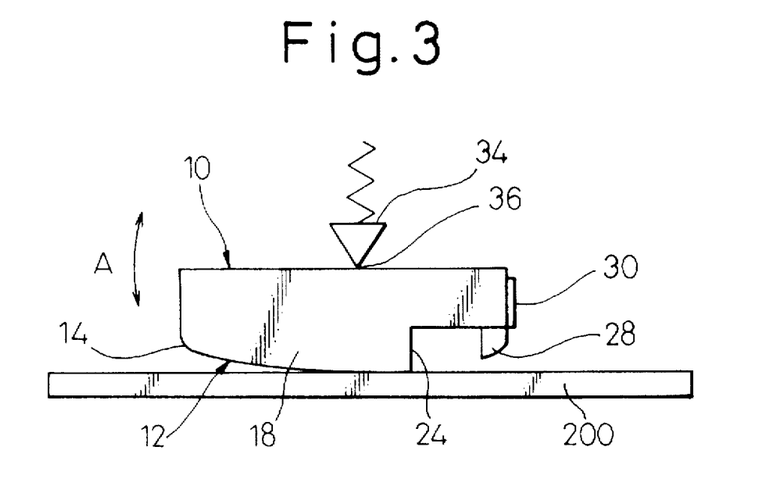
FIG. 3 is a side view of the magnetic head slider of FIG. 1, shown in the state where the slider is ready to start a CSS.

As shown in FIG. 3, the slider 10 may be mounted onto a loading beam or slider carrier, shown in outline by a reference numeral 34, which is normally formed as an elastic thin plate made of, e.g., stainless steel. The slider carrier 34 pivotably carries the slider 10 in a pitching direction (shown by an arrow A) at a pivot 36, and biases the slider 10 toward a magnetic disk 200 under a predetermined pressing force due to the elastic deformation of the thin plate.

In the case that the pivot 36 is positioned at the center of the slider 10, i.e., along the center line 26 of the ABS 12, the slider 10 is brought into contact with the disk 200 at the highest center portion of the upper surface of at least one convexly curved rail arranged so as to cross the center line 26 in the pressure generating section 18, when the slider 10 is used in a CSS type magnetic disk unit and the disk 200 does not rotate. In this state, the remaining upper surface area of the rail and the upper surface of the bump 28 are distant from the disk 200 (see FIG. 3). Therefore, the slider 10 can eliminate a risk that the bump 28 comes into contact with the disk 200, when the slider 10 is ready to start the CSS, or when the disk 200 rotates at a lower speed. Also, the slider 10 can quickly leave the disk 200 when it starts to rotate. Consequently, the risk of wear or fracture of the slider 10, particularly of the bump 28, can be reduced.

Figure 4:
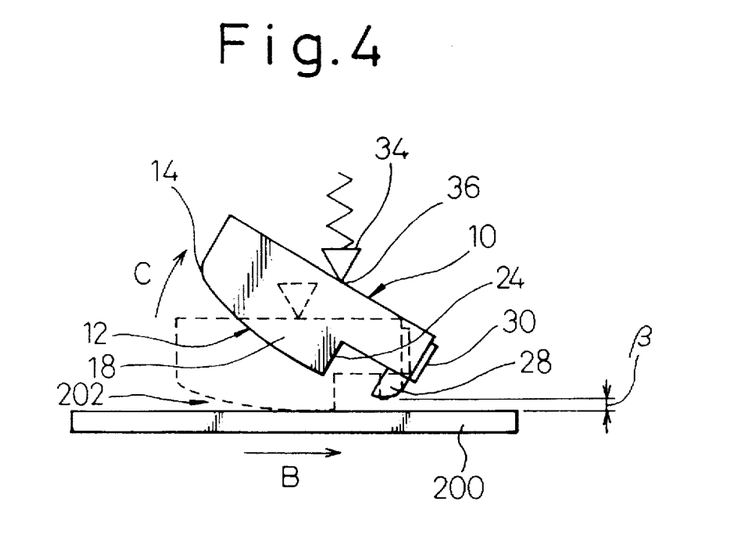
FIG. 4 is a side view of the magnetic head slider of FIG. 1, shown in the state where the slider flies over a rotating disk.

As shown in FIG. 4, when the disk 200 rotates in a direction B, the slider 10 flies over the disk 200 due to the dynamic pressure applied to the pressure generating section 18, and is swung about the pivot 36 in a pitching direction C to lift the air-introducing end 14. In this respect, the pressure generating section 18 of the slider 10 can generate both positive and negative pressure due to air passing through a gap 202 formed between the slider 10 and the rotating disk 200 so that, even if the rotation speed of the disk 200 is changed, a lifting force for lifting the slider 10 against the pressing force of the carrier 34, due to the dynamic pressure applied to the pressure generating section 18, hardly varies. Also, when the slider 10 flies over the rotating disk 200, the distance between the disk 200 and the portion, located nearest the disk 200, of the upper surface of the rail in the pressure generating section 18 is larger than the mean free path of the molecules of air passing through the gap 202. Therefore, the dynamic pressure applied to the pressure generating section 18 can be prevented from being affected by rarefied air, and thus the slider 10 can obtain a stable lifting force.

Further, the bump 28 generates little dynamic pressure, so that the slider 10 allows the bump 28 of the head element 30 to be maintained at a lower flying height, even when the rotation speed of the disk 200 is increased. That is, the flying height β (see FIG. 4) does not change much even when the disk rotation speed varies. Consequently, the slider 10 can effectively establish a generally constant, lower flying height, e.g., in a range between 30 nm and 50 nm.

The slider 10 also can reduce the flying height β to less than 30 nm, i.e., a contact recording condition, by suitably selecting the shapes and dimensions of the rail(s) arranged in the pressure generating section 18. In the contact recording condition, the slider 10 can obtain a stable lifting force against the pressing force of the carrier 34, and thus a load or abutting force applied to the bump 28 can be stably reduced. Therefore, the conventional slider carrier can be used as the carrier 34, which facilitate the easy manufacture of the slider 10. Further, in the contact recording condition, the slider 10 can prevent the load from being varied due to external factors such as vibration or shock, because the slider is supported in a balanced state by the air dynamic pressure and the pressing force of the carrier 34.

Figure 5:
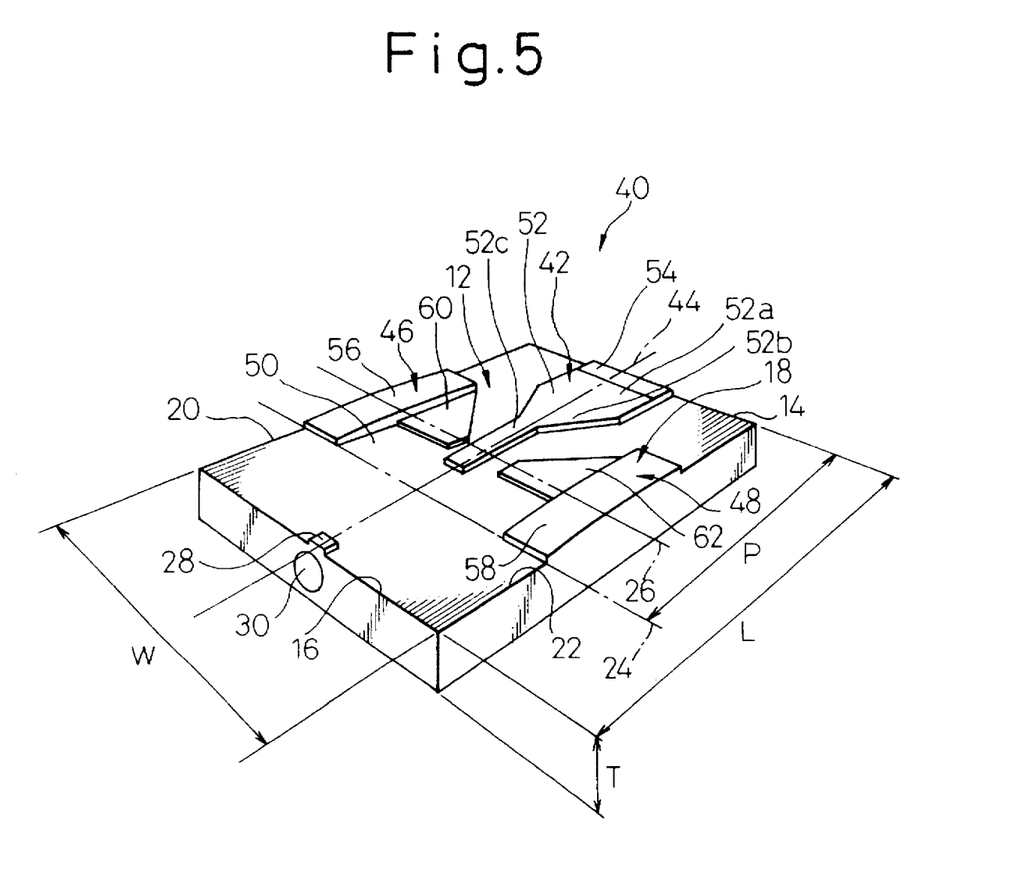
FIG. 5 is a perspective view of a magnetic head slider which includes a pressure generating section formed in accordance with one example of the present invention.
Figure 6:
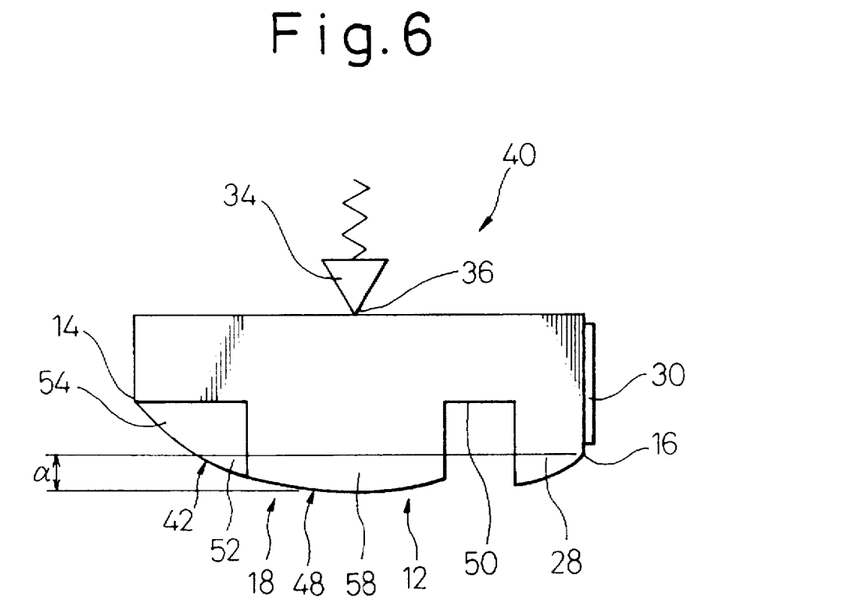
FIG. 6 is a side view of the magnetic head slider of FIG. 5.

FIGS. 5 and 6 show a magnetic head slider 40 which includes the pressure generating section 18 formed in accordance with one preferred example of the present invention. The slider 40 includes the crown ABS 12 provided with the pressure generating section 18 as mentioned above. The pressure generating section 18 of the slider 40 is provided with one center rail 42 elongated from the air-introducing end 14 to near the center line 26 along a longitudinally extending center line 44 of the ABS 12, and two side rails 46, 48 spaced from the center rail 42 and elongated respectively along side edges 20, 22 of the ABS 12 so as to cross the center line 26. These rails 42, 46, 48 define a recess 50 therebetween. It is preferred that the shapes and arrangements of the rails 42, 46, 48 are symmetrical about the center line 44, so as to prevent the slider 40 from rolling during flight.

The center rail 42 includes a main portion 52 having a convexly curved upper surface, and an optional portion 54 having a tapered-down or stepped-down upper surface adjacent to the upper surface of the main portion 52. The main portion 52 has a funnel-like shape in plan, and includes a wider front part 52a adjacent longitudinally to the rear of the optional portion 54, a gradually narrowing intermediate part 52b adjacent longitudinally to the rear of the front part 52a, and a narrower rear part 52c adjacent longitudinally to the rear of the intermediate part 52b. The optional portion 54 is arranged along the air-introducing end 14, adjacent to the front of the main portion 52, so as to facilitate introducing a large amount of air onto the upper surface of the main portion 52.

The side rails 46, 48 respectively include first portions 56, 58 each having a convexly curved upper surface, and second portions 60, 62 each having a stepped-down upper surface adjacent to and lower than the upper surface of each first portion 56, 58. Each first portion 56, 58 has a rectangular shape in plan, and is arranged along the side edge 20, 22 of the ABS 12 so as to cross the center line 26. The front edge of the first portion 56, 58 is spaced from the air-introducing end 14, and the rear edge of the first portion 56, 58 is disposed on the boundary 24. Each second portion 60, 62 is arranged adjacent laterally inside to the first portion 56, 58, and has a trapezoidal shape in plan so as to gradually widen in the longitudinal direction toward the boundary 24. The wider rear part of the second portion 60, 62 of each side rail 46, 48 is opposed to and spaced from the narrower rear part 52c of the main portion 52. In this manner, the recess 50 is provided with two branches extending from the air-introducing end 14 and converging on the generally center of the ABS 12, and is abruptly widened at the rear side of the second portion 60, 62.

When the slider 40 flies over the rotating magnetic disk, positive pressure is generated on the upper surfaces of the center and side rails 42, 46, 48. In this respect, the positive pressure generated on the stepped-down second portions 60, 62 of the side rails 46, 48 is lower than that on the first portions 56, 58. At the same time, negative pressure is generated on some portions of the recess 50, which recess portions are located rearward of the rails 42, 46, 48, especially rearward of the second portions 60, 62, because the gap between the slider 40 and the rotating magnetic disk is abruptly widened at these recess portions. For example, the positive and negative pressures required to establish a preferred flying performance can be obtained when the distance between the upper surfaces of the center rail 42 and the second portions 60, 62 as well as the first portions 56, 58 and the second portions 60, 62 is 500 nm, and the distance between the upper surfaces of the second portions 60, 62 and the bottom of the recess 50 is 1,500 nm. However, the dimensions and arrangement of the rails 42, 46, 48, as well as the heights of the rails 42, 46, 48 and second portions 60, 62, may be variously selected to adjust the positive and negative pressure generated on the pressure generating section 18 into a desired range.

The slider 40 further includes one bump 28 with a convexly curved upper surface, arranged generally at the center of the air-discharging end 16 and spaced in a longitudinal direction from the center and side rails 42, 46, 48 of the pressure generating section 18. The bump 28 has such a small dimension that dynamic pressure due to the air introduced onto the ABS 12 is hardly applied to the bump 28. The slider 40 further includes a thin-film magnetic head element 30 formed adjacent to the bump 28 as mentioned above.

The slider 40 has advantageous effects as previously stated concerning the slider 10. That is, the slider 40 can eliminate a risk that the bump 28 comes into contact with the rotating magnetic disk, when the slider 40 is ready to start the CSS, or when the disk rotates at a lower speed, whereby the risk of wear or fracture of the slider 40, particularly of the bump 28, can be reduced. Also, the slider 40 can provide a stable lifting force, and enables the bump 28 of the head element 30 to be maintained at a lower flying height even when the disk rotation speed is increased, so that the slider 40 can effectively establish a generally constant, lower flying height.

Particularly, in the slider 40, positive pressure is generated mainly on the front part of the pressure generating section 18 about the center line 26, and negative pressure is generated mainly on the rear part of the pressure generating section 18 about the center line 26. Accordingly, even when the pivot 36 is positioned at the generally center of the slider 40, the larger pitch angle than that of the conventional slider as disclosed in EP 0558983 A1 can be easily obtained when the disk rotation speed is increased. If the pivot is positioned at the rearward of a laterally extending center line in order to obtain the larger pitch angle in the conventional slider, a moment of inertia on the pitching motion of the slider is increased, which deteriorates the flying performance of the slider for following the undulations of the rotating disk.

The pitch angle of the slider 40 thus can vary at a large rate of change when the disk rotation speed is varied. The ABS 12 of the slider 40 may be structured so that the lowering distance of the bump 28 caused due to the pitching motion of the slider 40 is equalized with the lifting distance of the pivot 36 caused due to the lifting force applied to the slider 40, and thereby the flying height of the bump 28 can be maintained at a substantially constant level (see FIG. 4) when the disk rotating speed is increased.

Alternatively, the ABS 12 of the slider 40 may be structured so that the lowering distance of the bump 28 caused due to the pitching motion of the slider 40 becomes larger than the lifting distance of the pivot 36 caused due to the lifting force applied to the slider 40, and thereby the flying height of the bump 28 can be reduced when the disk rotating speed is increased. The slider having such a flying performance may be preferably used in a magnetic disk unit which does not utilize a CSS method. In this case, the slider is carried at a distance from a magnetic disk when the disk does not rotate or rotates at lower speed, and the bump of the magnetic head is brought near the disk rotating at high speed.

Figure 7:
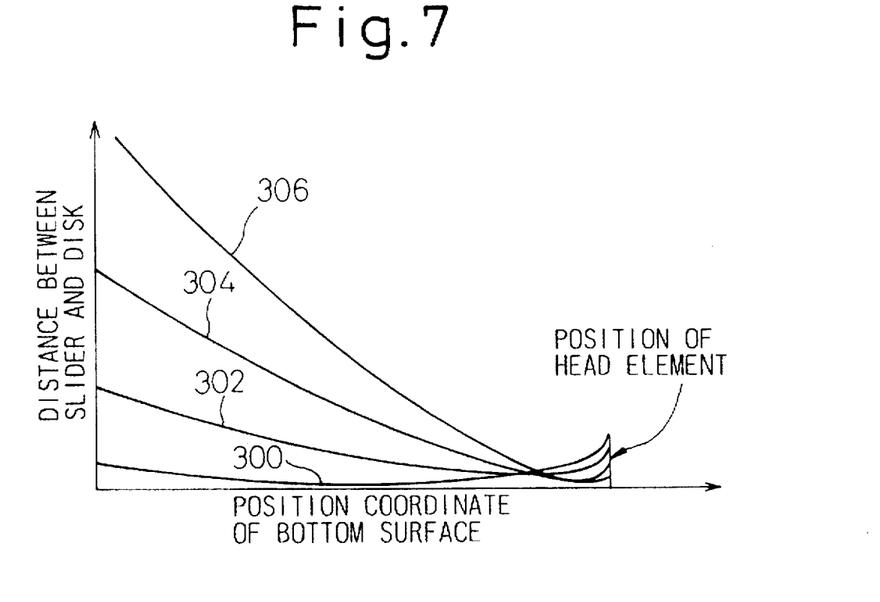
FIG. 7 shows a shifting aspect of a bottom surface near the rear end of the slider according to the present invention in proportion as a disk rotation speed is varied.

FIG. 7 illustrates in outline the shifting aspect of the bottom surface near the air-discharging end of the slider according to the present invention in proportion as the disk rotation speed is varied, so as to show the variation of a flying height. The recess defined on the ABS is not shown in FIG. 7. Curve 300 shows the bottom surface in a condition where the magnetic disk does not rotate or where the slider is ready to start the CSS. Curve 302 shows the bottom surface in a condition where the magnetic disk rotates at a lower speed or where the slider starts the CSS. Curves 304, 306 show the bottom surfaces in a condition where the magnetic disk rotates at a higher speed required for enabling the magnetic head element to read or write an information on the disk. As is clearly shown in FIG. 7, the bump or the magnetic head element of the inventive slider is distant from the disk when the disk does not rotate or rotates at lower speed, and the pitch angle is remarkably increased to bring the bump or the magnetic head element near the disk as the disk rotation speed rises.

The slider 40 shown in FIG. 5 may have various shapes and dimensions. For example, the slider 40 may have a generally rectangular parallelepiped shape of a dimension of 1.2 mm (L)×1.0 mm (W)×0.3 mm (T). The distance between the air-introducing end 14 and the boundary 24 may be 0.95 mm. In this case, the surface area of the pressure generating section 18 is 83% of that of the ABS 12. The bump 28 may have a dimension in plan of 0.05 mm×0.05 mm. The longitudinal distance between the boundary 24 and the bump 28 may be 0.2 mm. In this case, the difference, between the height of the rear end of the first portion 56, 58 of the side rail 46, 48 from the rotating disk and the flying height of the bump 28 from the rotating disk, increases 20 nm as the pitch angle rises 100μ rad, so that the positive pressure generated on the rails 42, 46, 48 is not affected by rarefied air passing through the gap between the slider 40 and the rotating disk. The distance between the upper surfaces of the center rail 42 and the second portions 60, 62 as well as the first portions 56, 58 and the second portions 60, 62 may be 500 nm, and the distance between the upper surfaces of the second portions 60, 62 and the bottom of the recess 50 may be 1,500 nm. The crown height α may be in a range from 10 nm to 40 nm, and preferably be 20 nm.

Figure 8:
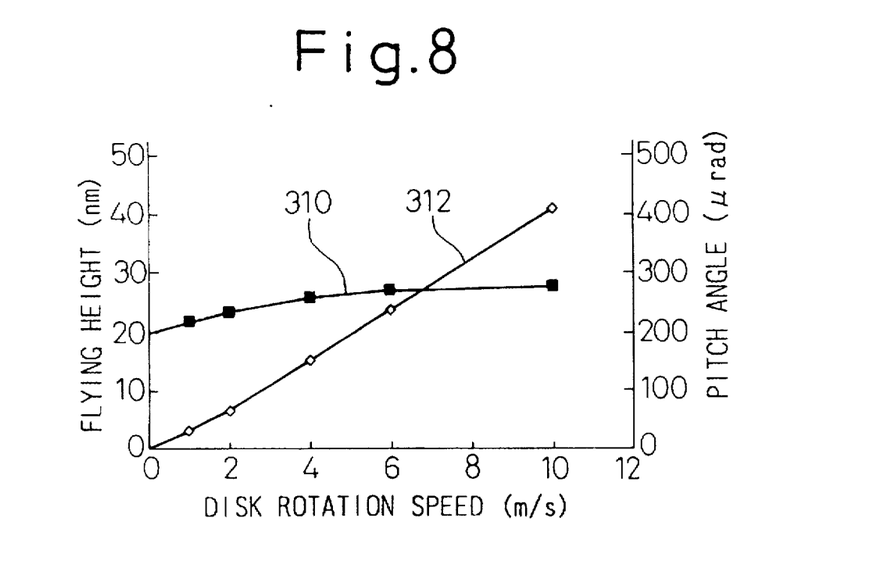
FIG. 8 shows varying aspects of a flying height and a pitch angle of the slider of FIG. 5, as a function of the disk rotation speed.

FIG. 8 shows a varying aspect of a flying height by curve 310 and a varying aspect of a pitch angle by curve 312, at the time of changing the disk rotation speed, for the slider 40 having above-mentioned dimensions, on the basis of the result on solving an equation for lubrication of a gap flow between the slider and the disk. In this case, the pressing force due to the loading beam or slider carrier is 19.6 mN. As is clearly shown in FIG. 8, the flying height is varied in a range from 24 nm to 30 nm, i.e., is maintained in generally constant, low level, when the disk rotation speed is changed in a range from 2 m/s to 10 m/s.

Figure 9:
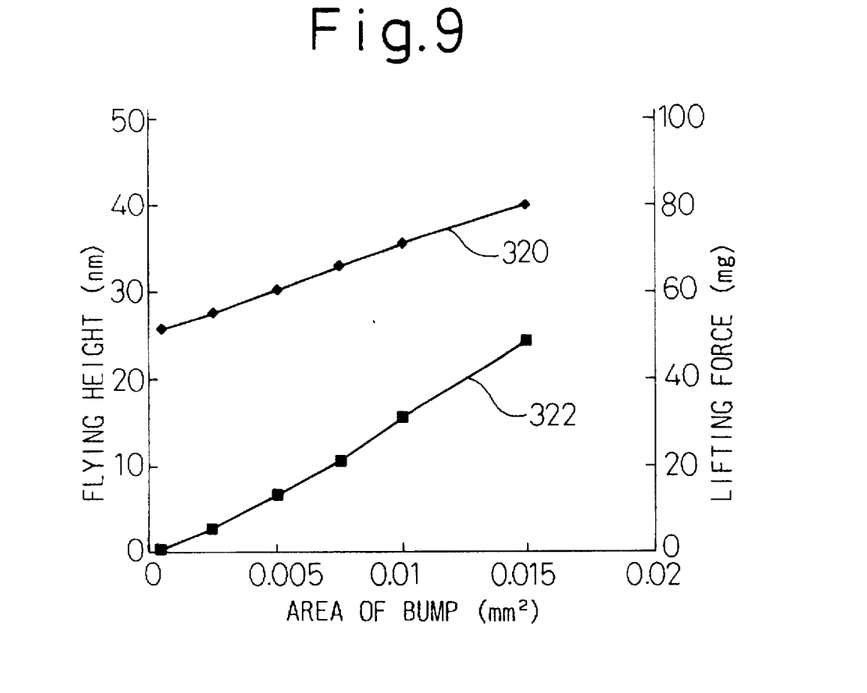
FIG. 9 shows varying aspects of a flying height and a lifting force of the slider of FIG. 5, as a function of the disk rotation speed.

The bump 28 of the slider 40 should be minimized as much as possible to lower the flying height to the required level. FIG. 9 shows a varying aspect of a flying height by curve 320 and a varying aspect of a lifting force by curve 322, when changing the plan area of the bump 28 in the slider 40, on the basis of the result of a simulation. In this case, the disk rotation speed is 10 m/s, and the pressing force due to the slider carrier is 19.6 mN. As is clearly shown in FIG. 9, the area of the bump 28 is required to be reduced into 0.005 mm$^2$ and less, in order to reduce the flying height into 30 nm and less. Preferably, the shape in plan of the bump is generally square, in order to reduce the risk of chipping of the bump on a manufacturing process or a CSS.

Figure 10:
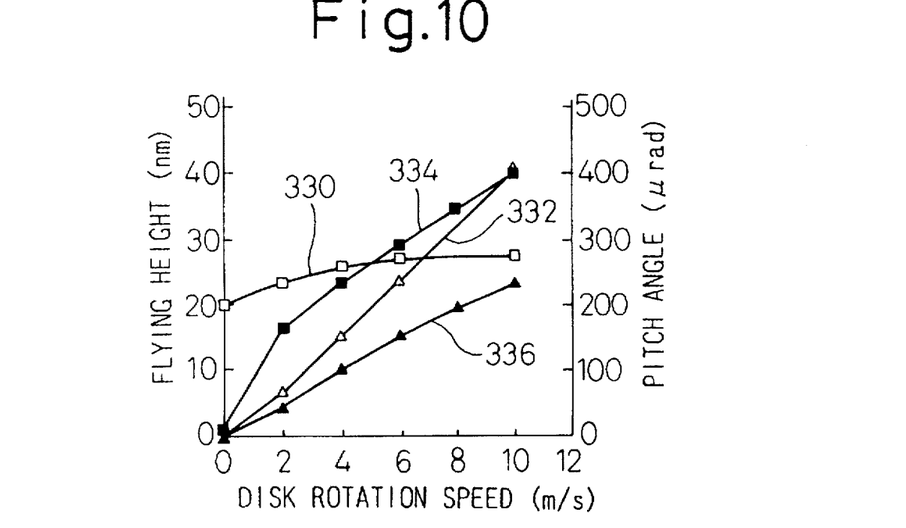
FIG. 10 shows varying aspects of flying heights and pitch angles of both the slider of FIG. 5 and the conventional slider, as a function of the disk rotation speed.

FIG. 10 illustrates a comparison of the flying performance of the slider 40 of the present invention with that of the conventional slider of EP 0558983 A1. Curve 330 shows a varying aspect of a flying height of the slider 40, curve 332 shows a varying aspect of a pitch angle of the slider 40, curve 334 shows a varying aspect of a flying height of the conventional slider, and curve 336 shows a varying aspect of a pitch angle of the conventional slider, when changing the disk rotation speed. As is clearly shown in FIG. 10, the slider 40 can maintain the flying height in generally constant level and can increase the pitch angle in larger rate, in comparison with the conventional slider.

The slider 40 shown in FIG. 5 may be manufactured by various methods. For example, the ABS 12 can be processed by an ion milling method as mentioned below. In the first stage, the surface of an unprocessed slider material, on which the ABS 12 is to be provided, is entirely coated with a dry film resist. A mask is attached onto the resist so that the portions of the resist, corresponding to the rails 42, 46, 48 and the bump 28, are irradiated with ultraviolet rays, and then the resist and the mask are entirely irradiated with ultraviolet rays. After that, development is carried out by using solution of sodium carbonate at a 1% concentration, whereby the portions of the resist, which are not irradiated with ultraviolet rays, are removed. In this state, the first ion milling is performed to process the portions of the surface, from which the resist is removed, into a desired depth corresponding to the height of the second portions 60, 62 of the side rails 46, 48 from the bottom of the recess 50, e.g., to a 1,500 nm depth. Then, the remaining resist is removed by a dilute alkaline solution.

In the second stage, the processed surface is again entirely coated with a dry film resist. A mask is attached onto the resist so that the portions of the resist, corresponding to the center rail 42, the first portions 56, 58 of the side rails 46, 48, and the bump 28, are irradiated with ultraviolet rays, and then the resist and the mask are entirely irradiated with ultraviolet rays. After that, development is carried out in the same manner as mentioned above, and the second ion milling is performed to process the portions of the surface, from which the resist is removed, into a desired depth corresponding to the height of the first portions 56, 58 from the second portions 60, 62, e.g., to a 500 nm depth. Then, the remaining resist is removed by a dilute alkaline solution. In this manner, the ABS 12, including the center rail 42, the first portions 56, 58 of the side rails 46, 48, and the bump 28, all of them having 2,000 nm height from the bottom of the recess 50, and the second portions 60, 62 of the side rails 46, 48 having 1,500 nm height from the recess bottom, is formed.

The crown shape of the ABS may be provided by, e.g., roughening the back surface of the slider, on which the ABS is not provided, into roughness larger than that of the ABS. In this manner, the back surface is subjected to a residual stress, and thereby the slider is curved to form the crown ABS. The height and shape of the crown can be controlled by adjusting the position and dimension of the roughened portion on the back surface.

It is possible, in the slider of the present invention, to round off the corners of the bump provided in the ABS without changing the dynamic pressure applied to the bump. The rounded bump is advantageous to prevent the magnetic disk from being damaged due to the collision of the bump. Further, it is effective to entirely cover the ABS with a hard carbon layer so as to improve the wear and abrasion resistance of the ABS.

Figure 11:
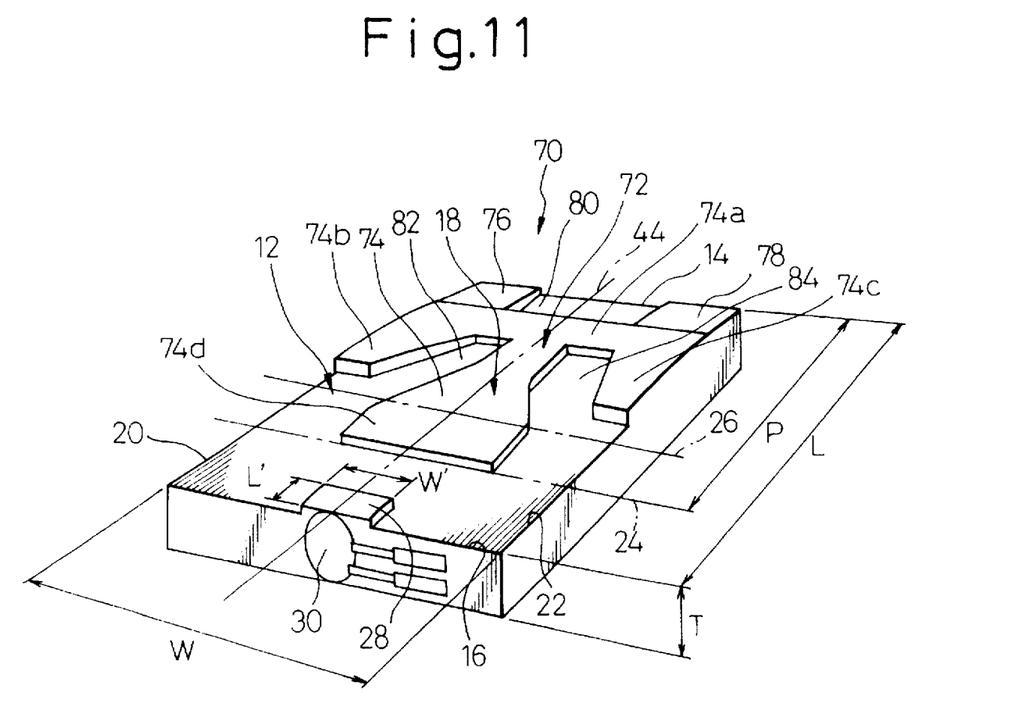
FIG. 11 is a perspective view of a magnetic head slider which includes a pressure generating section formed in accordance with another example of the present invention.

FIG. 11 shows a magnetic head slider 70 which includes the pressure generating section 18 formed in accordance with another preferred example of the present invention. The slider 70 includes the crown ABS 12 provided with the pressure generating section 18 as mentioned above. The pressure generating section 18 of the slider 70 is provided with one rail 72 which includes a main portion 74 having a convexly curved upper surface, and two optional portions 76, 78 each having a tapered- or stepped-down upper surface adjacent to the upper surface of the main portion 74.

The main portion 74 has a generally symmetrical T-shape in plan, and includes a wider front part 74a adjacent longitudinally to the rear of the optional portions 76, 78 and laterally extending between the side edges 20, 22 of the ABS 12 in parallel to and near the air-introducing end 14, two side parts 74b, 74c adjacent longitudinally to the rear of the front part 74a and respectively extending along the side edges 20, 22, and a center part 74d adjacent longitudinally to the rear of the front part 74a and extending along the center line 44. The side parts 74b, 74c gradually narrow toward the air-discharging end 16, as well as the center part 74d gradually widen toward the air-discharging end 16. The optional portions 76, 78 are arranged along the air-introducing end 14 and the side edges 20, 22, respectively, adjacent to the front of the main portion 74, so as to facilitate introducing a larger amount of air onto the upper surface of the main portion 74.

The front edge of the front part 74a is spaced from the air-introducing end 14. The rear edges of the side parts 74b, 74c do not reach the boundary 24. The center part 74d extends to across the center line 26, and the rear edge of the center part 74d is disposed on the boundary 24. The widest portion of the center part 74d is preferably disposed on the center of the ABS 12. The front edges of the optional portions 76, 78 are arranged on the air-introducing end 14. Therefore, the front part 74a and the optional portions 76, 78 define a recess 80 therebetween, and the front part 74a, side parts 74b, 74c, and the center part 74d define recesses 82, 84 therebetween. The narrowest portion of the center part 74d is formed in order to separate the recesses 82, 84 from each other, and may be so narrow that positive pressure is hardly generated on the narrowest portion. In this manner, the recess 80 is provided with two branches diverging from the front of the ABS 12 and extending toward the air-discharging end 16.

When the slider 70 flies over the rotating magnetic disk, positive pressure is generated mainly on the upper surfaces of the side and center parts 74b, 74c, 74d. At the same time, negative pressure is generated on the recesses 82, 84, especially at the portions adjacent the rear edge of the front part 74a. In this respect, it is advantageous to gradually narrow the recesses 82, 84 toward the air-discharging end 16, so as to increase the negative pressure. For example, the positive and negative pressures required to establish a preferred flying performance can be obtained when the depth of each recess 82, 84 is 2,000 nm. However, the dimensions and arrangement of the parts 74b, 74c, 74d, as well as the depth of each recess 82, 84, may be variously selected to adjust the positive and negative pressure generated on the pressure generating section 18 into a desired range.

The slider 70 further includes one bump 28 with a convexly curved upper surface, arranged generally at the center of the air-discharging end 16 and spaced in a longitudinal direction from the center part 74d of the rail 72 of the pressure generating section 18. The bump 28 has such small dimensions that a dynamic pressure due to the air introduced onto the ABS 12 is hardly applied to the bump 28. The slider 70 further includes a thin-film magnetic head element 30 formed adjacent to the bump 28 as mentioned above.

The slider 70 has advantageous effects as previously stated concerning the sliders 10, 40. That is, the slider 70 can eliminate a risk that the bump 28 comes into contact with the rotating magnetic disk, when the slider 70 is ready to start the CSS, or when the disk rotates at a lower speed, whereby the risk of wear or fracture of the slider 70, particularly of the bump 28, can be reduced. Also, the slider 70 can provide a stable lifting force, and enables the bump 28 of the head element 30 to be maintained at a lower flying height even when the disk rotation speed is increased, so that the slider 70 can effectively establish a generally constant and low flying height.

Particularly, in the slider 70, positive pressure generated on the wider portion of the center part 74d of the rail 72, disposed generally at the center of the ABS 12, can support the center of gravity of the slider 70. Consequently, the slider 70 can obtain a more stable flying performance in which a pitch angle changes little due to external factors such as vibration. Also, the slider 70 can quickly take off from the disk upon starting the CSS. Further, in the slider 70, positive pressure is generated mainly on the front and center parts of the pressure generating section 18 about the center line 26, and negative pressure is generated mainly on the front part of the pressure generating section 18 about the center line 26. Accordingly, when the pivot is positioned generally at the center of the slider 70, the pitch angle changes to a smaller extent than that of the slider 40, when the disk rotation speed is varied, but the flying height can be maintained at a constant low level.

The slider 70 may have various shapes and dimensions. For example, the slider 70 may have a generally rectangular parallelepiped shape of a dimension of 1.5 mm (L)×1.0 mm (W)×0.3 mm (T). The distance between the air-introducing end 14 and the boundary 24 may be 1.2 mm. In this case, the surface area of the pressure generating section 18 is 80% of that of the ABS 12. The bump 28 may have a dimension in plan of 0.05 mm (L')×0.1 mm (W'). The longitudinal distance between the boundary 24 and the bump 28 may be 0.25 mm. In this case, the difference, between the height of the rear end of the center part 74d of the rail 72 from the rotating disk and the flying height of the bump 28 from the rotating disk, increases to 25 nm as the pitch angle rises 100μ rad, so that the positive pressure generated on the rail 72 is not affected by rarefied air passing through the gap between the slider 70 and the rotating disk. The depth of the recesses 80, 82, 84 may be 2,000 nm. The crown height may be in a range from 10 nm to 40 nm, and will preferably be 20 nm. The bump 28 should be minimized in the manner mentioned for the slider 40.

Figure 12:
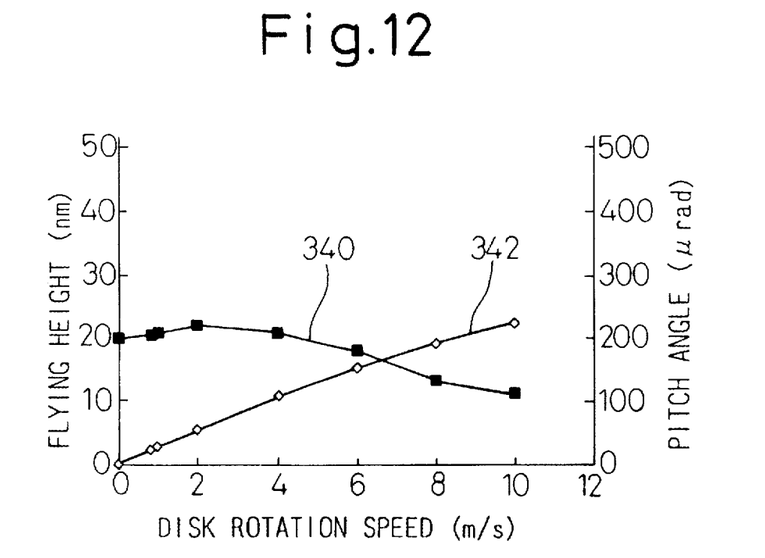
FIG. 12 shows varying aspects of a flying height and a pitch angle of the slider of FIG. 11, as a function of the disk rotation speed.

FIG. 12 shows a varying aspect of a flying height by curve 340 and a varying aspect of a pitch angle by curve 342, when changing the disk rotation speed, in the slider 70 having above-mentioned dimensions, on the basis of the result of solving an equation for lubrication of a gap flow between the slider and the disk. In this case, the pressing force due to the loading beam or slider carrier is 19.6 mN. As is clearly shown in FIG. 12, the flying height is varied in a range from 10 nm to 22 am, i.e., is maintained in generally constant, lower level, when the disk rotation speed is changed in a range from 2 m/s to 10 m/s. On the other hand, the height of the rear end of the center part 74d of the rail 72 from the rotating disk is approximately 30 nm when the disk rotation speed is 2 m/s. Therefore, the slider 70 can be applied with a further stable lifting force without being affected by rarefied air.

Figure 13:
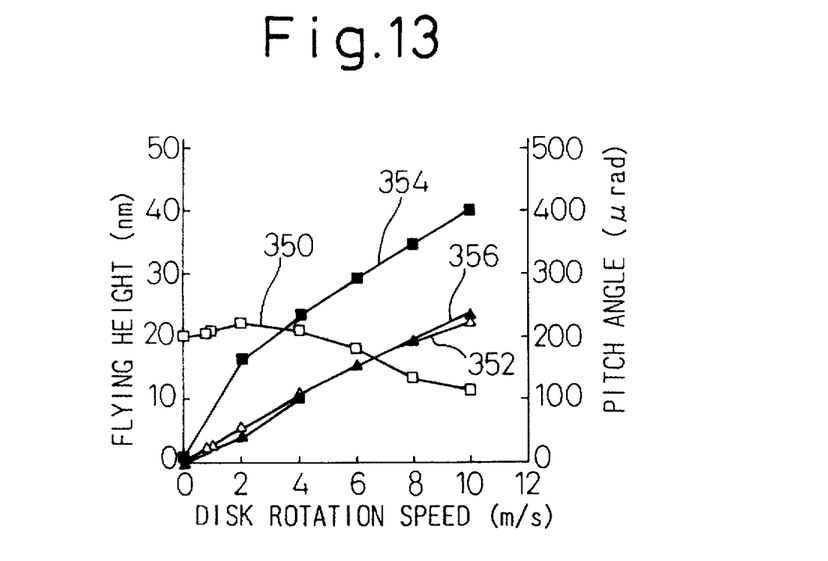
FIG. 13 shows varying aspects of flying heights and pitch angles of both the slider of FIG. 11 and the conventional slider, as a function of the disk rotation speed.

FIG. 13 illustrates a comparison of the flying performance of the slider 70 of the present invention with that of the conventional slider of EP 0558983 A1. Curve 350 shows a varying aspect of a flying height of the slider 70, curve 352 shows a varying aspect of a pitch angle of the slider 70, curve 354 shows a varying aspect of a flying height of the conventional slider, and curve 356 shows a varying aspect of a pitch angle of the conventional slider, when changing the disk rotation speed. As is clearly shown in FIG. 13, the slider 70 can maintain the flying height at generally constant low level, in comparison with the conventional slider, although the varying aspect of a pitch angle of the slider 70 is generally the same as that of the conventional slider.

The slider 70 shown in FIG. 11 may be manufactured by various methods, such as a method similar to that for the slider 40 as previously stated. If the recesses 80, 82, 84 have the same depth, only one mask must be used, which can simplify the manufacturing process and reduce the manufacturing cost.

Figure 14:
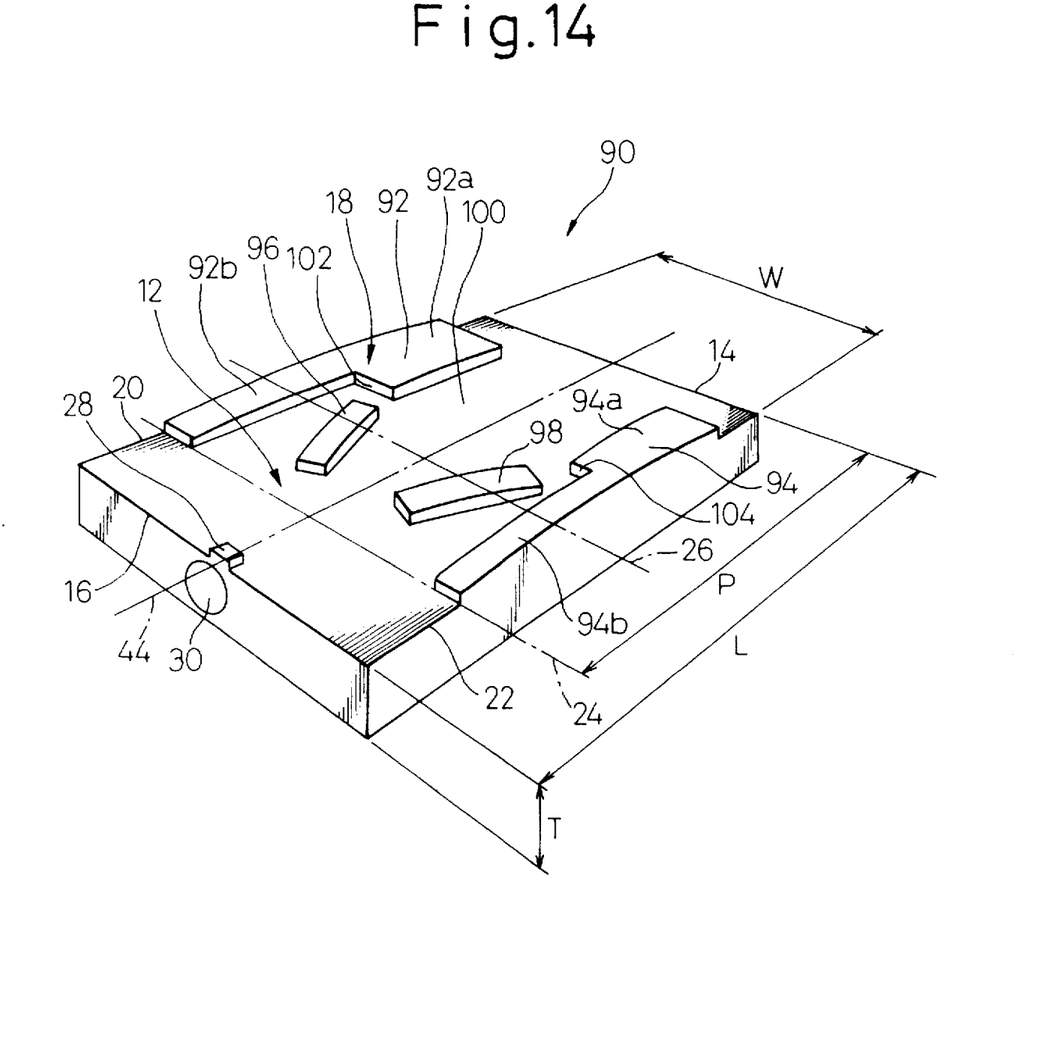
FIG. 14 is a perspective view of a magnetic head slider which includes a pressure generating section formed in accordance with yet another example of the present invention.

FIG. 14 shows a magnetic head slider 90 which includes the pressure generating section 18 formed in accordance with yet another preferred example of the present invention. The slider 90 includes the crown ABS 12 provided with the pressure generating section 18 as mentioned above. The pressure generating section 18 of the slider 90 is provided with two outside rails 92, 94 elongated from near the air-introducing end 14 to the boundary 24 respectively along side edges 20, 22 of the ABS 12, and two inside rails 96, 98 spaced from the outside rails 92, 94 and from each other and elongated to across the center line 26. These rails 92, 94, 96, 98 define a recess 100 therebetween. It is preferred that the shapes and arrangements of the rails 92, 94, 96, 98 are symmetrical about the center line 44, so as to prevent the slider 90 from rolling during the flight.

The outside rails 92, 94 have convexly curved upper surfaces, and respectively include wider front parts 92a, 94a slightly and longitudinally spaced from the air-introducing end 14, and narrower rear parts 92b, 94b adjacent longitudinally to the rear of the front parts 92a, 94a. The front parts 92a, 94a and the rear parts 92b, 94b have rectangular shapes in plan, and thereby hook-like inner edges 102, 104 are formed inside the rails 92, 94 between the front parts 92a, 94a and the rear parts 92b, 94b.

The inside rails 96, 98 have rectangular shapes in plan and convexly curved upper surfaces. The front edges of the inside rails 96, 98 are arranged rearwardly near the hook-like inner edges 102, 104, and the rear edges of the inside rails 96, 98 do not reach the boundary 24. The inside rails 96, 98 are arranged opposite to the rear parts 92b, 94b of the outside rails 92, 94, respectively, and are elongated to gradually increase the distance between the rails 96, 98 and the rear parts 92b, 94b from the front to rear edges of the rails 96, 98.

When the slider 90 flies over the rotating magnetic disk, positive pressure is generated on the upper surfaces of the outside and inside rails 92, 94, 96, 98. In this respect, the positive pressure generated on the front parts 92a, 94a of the outside rails 92, 94 is higher than that on the rear parts 92b, 94b and on the inside rails 96, 98. At the same time, negative pressure is generated on some portions of the recess 100, which are located at the rearward of the rails 92, 94, 96, 98, especially at the rearward of the inner edges 102, 104 and between the inside rails 96, 98 and the rear parts 92b, 94b. In this respect, the slider 90 can be prevented from rolling when a yaw angle of the slider about the rotating disk is varied, because the differently oriented outside and inside rails 92, 94, 96, 98 can prevent the pressure distribution on the pressure generating section 18 from changing.

The slider 90 further includes one bump 28 with a convexly curved upper surface, arranged generally at the center of the air-discharging end 16 and spaced in a longitudinal direction from the rear parts 92b, 94b of the outside rails 92, 94 of the pressure generating section 18. The bump 28 has such a small dimension that a dynamic pressure due to the air introduced onto the ABS 12 is hardly applied to the bump 28. The slider 90 further includes a thin-film magnetic head element 30 formed adjacent to the bump 28 as mentioned above.

The slider 90 has advantageous effects as previously stated concerning the slider 10. That is, the slider 90 can eliminate a risk that the bump 28 comes into contact with the rotating magnetic disk, when the slider 90 is ready to start the CSS, or when the disk rotates at a lower speed, whereby the risk of wear or fracture of the slider 90, particularly of the bump 28, can be reduced. Also, the slider 90 can reduce the flying height into less than 30 nm. i.e., a contact recording condition. In the contact recording condition, the slider 90 can obtain a stable lifting force against the pressing force of the slider carrier, even when the disk rotation speed is increased, and thus a load or abutting force applied to the bump 28 can be stably reduced. Therefore, the conventional slider carrier can be used, which facilitates the manufacture of the slider 90.

Particularly, in the slider 90, positive pressure is generated mainly on the front and center parts of the pressure generating section 18 about the center line 26, and negative pressure is generated mainly on the rear part of the pressure generating section 18 about the center line 26. Accordingly, even when the pivot is positioned generally at the center of the slider 90, a pitch angle larger than that of the conventional slider as disclosed in EP 0558983 A1 can be easily obtained when the disk rotation speed is increased. When the magnetic disk rotates at high speed, i.e., contact recording is performed, the slider 90 can minimize a load or abutting force applied to the bump 28 because of the stable lifting force, and can prevent the load from being varied due to external factors such as vibration or shock by the air dynamic pressure.

The slider 90 may have various shapes and dimensions. For example, the slider 90 may have a generally rectangular parallelepiped shape of a dimension of 1.2 mm (L)×1.0 mm (W)×0.3 mm (T). The distance between the air-introducing end 14 and the front edges of the outside rails 92, 94 may be 0.2 mm. The lengths (longitudinal dimension) of the outside rails 92, 94 may be 0.85 mm, and the widths (lateral dimension) of the front parts 92a, 94a may be 0.16 mm, and the widths of the rear parts 92b, 94b may be 0.08 mm. The lengths of the inside rails 96, 98 may be 0.47 mm, and the widths of the inside rails 96, 98 may be 0.08 mm. The distance between the air-introducing end 14 and the boundary 24 may be 0.95 mm. In this case, the surface area of the pressure generating section 18 is 83% of that of the ABS 12. The bump 28 may have a dimension in plan of 0.1 mm×0.1 mm. The longitudinal distance between the boundary 24 and the bump 28 may be 0.2 mm. In this case, the difference, between the height of the rear end of the rear parts 92b, 94b of the outside rails 92, 94 from the rotating disk and the flying height of the bump 28 from the rotating disk, increases 20 nm as the pitch angle rises 100µ rad, so that the positive pressure generated on the rails 92, 94, 96, 98 is not affected by rarefied air passing through the gap between the slider 90 and the rotating disk. The depth of the recesses 100 may be 5,000 nm. The crown height may be 26 nm. The bump 28 should be minimized in such a manner as mentioned on the slider 40.

Figure 15:
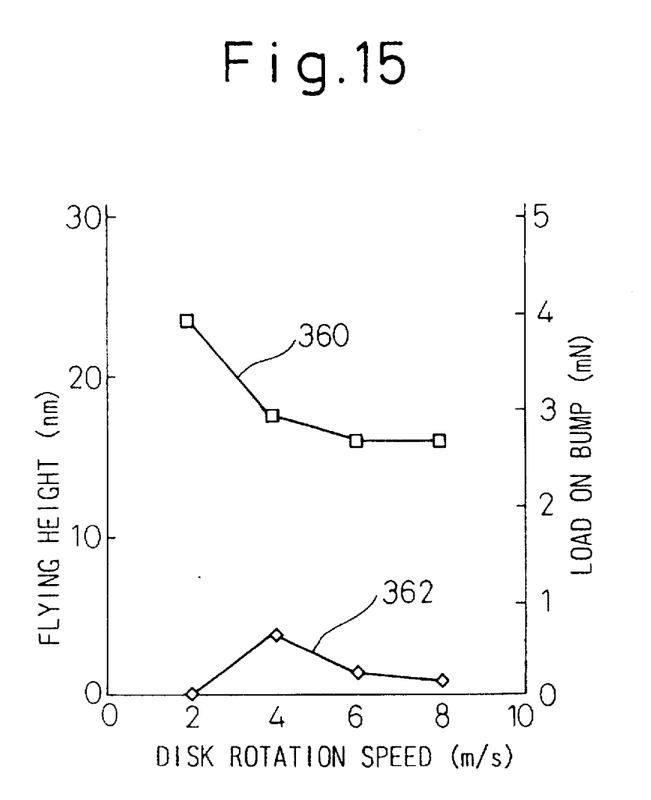
FIG. 15 shows varying aspects of a flying height and a load on bump of the slider of FIG. 14, as a function of the disk rotation speed.

FIG. 15 shows a varying aspect of a flying height by curve 360 and a varying aspect of a load or abutting force applied to the bump 28 by curve 362, when changing the disk rotation speed, in the slider 90 having above-mentioned dimensions, on the basis of the result of solving an equation for lubrication of a gap flow between the slider and the disk. In this case, the pressing force due to the loading beam or slider carrier is 4.9 mN. As is clearly shown in FIG. 15, the flying height is reduced and reaches approximately 16 nm. i.e., a glide height, when the disk rotation speed is increased from 2 m/s to 8 m/s. In this case, the bump 28 comes into contact with the rotating disk when the disk rotation speed exceeds 4 m/s. On the other hand, the load applied on the bump 28 changes in a range from 0.18 mN to 0.6 mN, when the disk rotation speed exceeds 4 m/s. This range of the load is approximately 4% to 12% of the pressing force of the slider carrier.

The slider 90 shown in FIG. 14 may be manufactured by various methods, such as a method similar to that of the slider 40 as previously stated.

While the invention has been particularly shown and described with reference to preferred embodiments thereof, it will be understood by those skilled in the art that various changes and modifications may be made without departing from the spirit and scope of the invention. The scope of the invention is therefore to be determined solely by the following claims.

I claim:

1. A magnetic head slider for use with a magnetic disk, said slider comprising:
   (a) a crown air-bearing surface adapted to be located opposite to a surface of a rotatable magnetic disk, said air-bearing surface having a generally rectangular shape and including
      (1) an air-introducing front end and longitudinally spaced therefrom an air-discharging rear end, said front and rear ends being formed respectively along two opposed end edges of said air-bearing surface,
      (2) a pressure generating section for generating both positive and negative pressures to apply a lifting force to said slider as a result of air being introduced from said air-introducing front end onto said air-bearing surface when the magnetic disk rotates, said pressure generating section extending from at or near said air-introducing front end to a laterally extending boundary line located between a laterally extending center line of said air-bearing surface and said air-discharging rear end, said pressure generating section including one elongated center rail extending from said air-introducing front end to near said laterally extending center line along a longitudinally extending center line of said air-bearing surface and two elongated side rails laterally spaced from said center rail and extending in a longitudinal direction along two opposed side edges of said air-bearing surface, said side rails extending across said laterally extending center line, said center rail and said side rails respectively having convexly curved upper surfaces for generating positive pressure on said upper surfaces, and defining therebetween a recess for generating negative pressure in said recess, said center rail having a gradually narrowing shape in the longitudinal direction toward said boundary line, and said side rails each having first portions having a convexly curved upper surface and second portions having a stepped-down upper surface adjacent to and lower than said upper surface of each first portion, each first portion having a rectangular shape and being arranged along each side edge of said air-bearing surface so that the first portion extends across said laterally extending center line, and each second portion being arranged laterally adjacent to and inside of each said first portion with respect to each side edge, each second portion having a trapezoidal shape that gradually widens in a longitudinal direction toward said boundary line, and (3) a head section arranged generally at a lateral center of said air-discharging rear end and longitudinally spaced rearwardly from said boundary line of said pressure generating section so that no portion of said head section lies adjacent a lateral side of said pressure generating section, said head section having substantially no dynamic pressure applied thereto due to the air introduced onto said air-bearing surface; and (b) a magnetic head element formed on said head section of said air-bearing surface.

2. The magnetic head slider of claim 1, wherein said head section is formed as a bump with a convexly curved upper surface, said bump having a small enough dimension that substantially no dynamic pressure due to air being introduced onto said air-bearing surface is applied to said bump, and said magnetic head element being located adjacent to a rear end surface of said bump which surface is arranged along said air-discharging rear end.

3. The magnetic head slider of claim 1, wherein said pressure generating section further includes a portion arranged along said air-introducing front end adjacent to a front of said center rail, said portion having a tapered-down or stepped-down upper surface adjacent to said convexly curved upper surface of said center rail for facilitating introduction of air onto said upper surface of said center rail.

4. The magnetic head slider of claim 1, wherein the shape and arrangement of said center rail is symmetrical about a longitudinally extending center line of said air-bearing surface.

* * * * *